United States Patent
Silva et al.

(10) Patent No.: US 11,787,340 B2
(45) Date of Patent: Oct. 17, 2023

(54) SIDEVIEW MIRROR ASSEMBLY WITH AN EXTENDABLE CAMERA

(71) Applicant: Toyota Motor Engineering & Manufacturing North America, Inc., Plano, TX (US)

(72) Inventors: Maurice P. Silva, Ann Arbor, MI (US); Nicholas E. Merkel, Canton, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 178 days.

(21) Appl. No.: 17/226,647

(22) Filed: Apr. 9, 2021

(65) Prior Publication Data

US 2022/0324383 A1 Oct. 13, 2022

(51) Int. Cl.
| | |
|---|---|
| *B60R 1/00* | (2022.01) |
| *B60R 1/12* | (2006.01) |
| *B60R 1/28* | (2022.01) |
| *B60R 1/078* | (2006.01) |
| *B60R 1/07* | (2006.01) |

(52) U.S. Cl.
CPC ............... *B60R 1/006* (2013.01); *B60R 1/07* (2013.01); *B60R 1/078* (2013.01); *B60R 1/12* (2013.01); *B60R 1/28* (2022.01); *B60R 2001/1253* (2013.01); *B60R 2300/101* (2013.01)

(58) Field of Classification Search
None
See application file for complete search history.

(56) References Cited

U.S. PATENT DOCUMENTS

| | | | |
|---|---|---|---|
| 9,057,833 B2 | 6/2015 | Bowers et al. | |
| 9,150,156 B2 | 10/2015 | Bowers et al. | |
| 9,321,410 B2 | 4/2016 | Hansen | |
| 9,676,336 B2* | 6/2017 | Peterson | ................. B60R 1/082 |
| 9,815,410 B2 | 11/2017 | Henion et al. | |
| 10,053,015 B2 | 8/2018 | Peterson et al. | |
| 2003/0098908 A1* | 5/2003 | Misaiji | ...................... B60R 1/00 |
| | | | 348/148 |
| 2003/0103142 A1 | 6/2003 | Hitomi et al. | |
| 2018/0178723 A1* | 6/2018 | Diaz | .................... H04N 5/2257 |
| 2020/0103905 A1* | 4/2020 | Gurin | ................... G05D 1/0287 |

FOREIGN PATENT DOCUMENTS

| | | |
|---|---|---|
| EP | 2955065 B1 | 12/2015 |
| KR | 20120016324 A | 2/2012 |

* cited by examiner

*Primary Examiner* — Xiaolan Xu
(74) *Attorney, Agent, or Firm* — Christopher G. Darrow; Darrow Mustafa PC (57) ABSTRACT

A sideview mirror assembly for a vehicle can comprise a body including a sideview mirror housing. The sideview mirror assembly can include a camera located in the body about the sideview mirror housing. The camera can have a field-of-view including an above-horizontal region directed rearward toward an overhead target position past the sideview mirror housing. The camera can be mounted for movement relative to the body between a normal position, in which the sideview mirror housing intersects the camera and the overhead target position in the above-horizontal region, and an extended position, in which the sideview mirror housing does not intersect the camera and the overhead target position in the above-horizontal region. Movement of the camera from the normal position to the extended position can unblock camera visibility of the overhead target position by the sideview mirror housing.

20 Claims, 4 Drawing Sheets

SIDEVIEW MIRROR ASSEMBLY WITH AN EXTENDABLE CAMERA

TECHNICAL FIELD

The embodiments disclosed herein relate to sideview mirror assemblies for a vehicle and, more particularly, to a sideview mirror assembly with an extendable camera.

BACKGROUND

Vehicles, especially those used for towing trailers, have sideview mirror assemblies for viewing the area to the side of the vehicle and/or the trailer. As a part of the sideview mirror assembly, the vehicle may include a sideview mirror and a camera for viewing parts of the vehicle and/or the trailer not visible through the sideview mirror.

SUMMARY

Disclosed herein are embodiments of a sideview mirror assembly with an extendable camera.

In one aspect, a sideview mirror assembly for a vehicle can comprise a body including a sideview mirror housing. The sideview mirror assembly can include a camera located in the body about the sideview mirror housing. The camera can have a field-of-view including an above-horizontal region directed rearward toward an overhead target position past the sideview mirror housing. The camera can be mounted for movement relative to the body between a normal position, in which the sideview mirror housing intersects the camera and the overhead target position in the above-horizontal region, and an extended position, in which the sideview mirror housing does not intersect the camera and the overhead target position in the above-horizontal region. Movement of the camera from the normal position to the extended position can unblock camera visibility of the overhead target position by the sideview mirror housing.

In another aspect, a sideview mirror assembly for a vehicle can comprise a body including a sideview mirror housing. The sideview mirror housing can include a bottom surface. The sideview mirror assembly can include a fisheye camera located in the body about the side view mirror housing and pointed substantially downward. The camera can have a field-of-view including an above-horizontal region. The above-horizontal region can include an upper periphery of the field-of-view and can be directed rearward toward an overhead target position past the sideview mirror housing. The camera can be mounted for movement relative to the body between a normal position, in which the camera is below the bottom surface, and the bottom surface intersects the camera and the overhead target position in the above-horizontal region, and an extended position, in which the camera is further below the bottom surface, and the bottom surface does not intersect the camera and the overhead target position in the above-horizontal region. Movement of the camera from the normal position to the extended position can unblock camera visibility of the overhead target position by the bottom surface.

In yet another aspect, a method of unblocking camera visibility of a camera located in a sideview mirror assembly of a vehicle can involve a camera located in a body of the sideview mirror assembly about a sideview mirror housing of the body. The camera can have a field-of-view including an above-horizontal region directed rearward toward an overhead target position past the sideview mirror housing. The camera can be mounted for movement relative to the body between a normal position and an extended position, and can be in the normal position, in which the sideview mirror housing intersects the camera and the overhead target position in the above-horizontal region. The method can include receiving an extension signal, and responsive to receiving the extension signal, extending the camera from the normal position to the extended position, in which the sideview mirror housing does not intersect the camera and the overhead target position in the above-horizontal region. Movement of the camera from the normal position to the extended position can unblock camera visibility of the overhead target position by the sideview mirror housing.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a sideview mirror assembly for a vehicle. The sideview mirror assembly includes a body and, as part of a camera assembly, a camera located in the body. The camera has a field-of-view including an above-horizontal region directed rearward toward an overhead target position. In some arrangements, with the camera in a normal position, the body can block a portion of the field-of-view by intersecting the camera and the overhead target position in the above-horizontal region. Accordingly, the camera can move between the normal position and an extended position, in which the camera visibility of the overhead target position is unblocked by the body.

Figure 1:
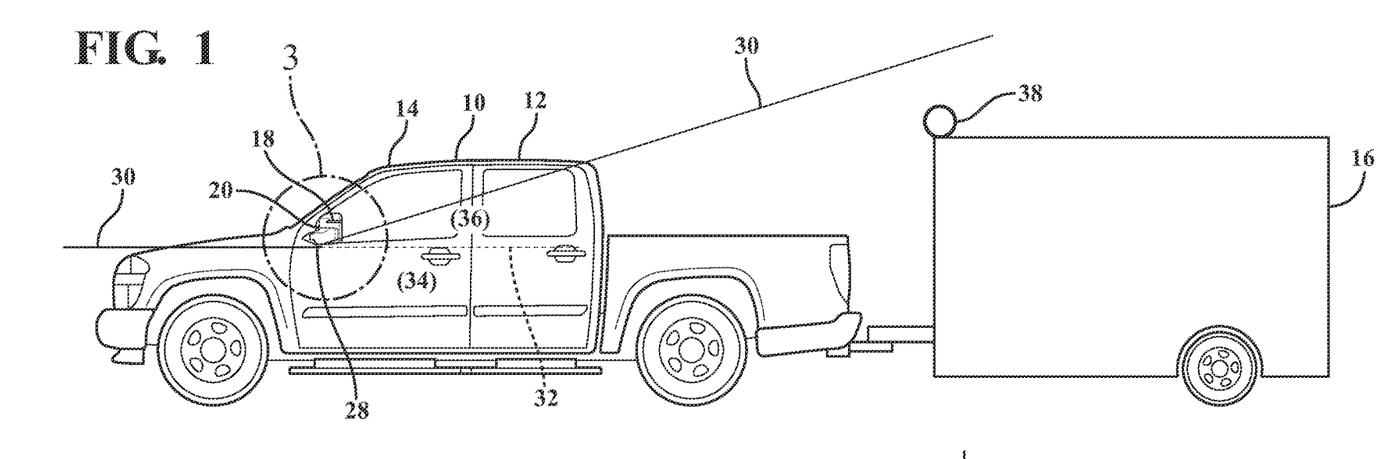
FIG. 1 is an example of a vehicle having a sideview mirror assembly with a sideview mirror housing and a camera assembly with a camera.

Part of a passenger vehicle 10 is shown in FIG. 1. In this description, uses of "front," "forward," and the like, and uses of "rear," "rearward," and the like, refer to the longitudinal directions of the vehicle 10. "Front," "forward," and the like refer to the front (fore) of the vehicle 10, while "rear," "rearward," and the like refer to the back (aft) of the vehicle 10. Uses of "side," "sideways," "transverse," and the like refer to the lateral directions of the vehicle 10. Uses of "above," "below," and the like refer to the vertical directions of the vehicle 10.

The vehicle 10 includes an exterior 12 and a number of interior compartments. The compartments include a passenger compartment 14, an engine compartment, a cargo area and the like. Among other things, the vehicle 10 includes seats, a dash assembly, an instrument panel, controls, and the like housed in the passenger compartment. Additionally, the vehicle 10 includes an engine, a motor, a transmission, and the like, as well as other powertrain components, such as wheels, housed in the engine compartment and elsewhere in the vehicle 10. The wheels support the remainder of the vehicle 10 on the ground. One, some or all of the wheels are powered by the remainder of the powertrain components to drive the vehicle 10 along the ground. The vehicle 10 can be any suitable vehicle configured to pull a trailer 16. For example, the vehicle 10 can be a truck, as shown. In other examples, the vehicle 10 can be an SUV or any other vehicle suitable for pulling a trailer. The trailer 16 can be any type of trailer, including a storage trailer or a camper.

The vehicle 10 includes two sideview mirror assemblies 18 for viewing the sides of the vehicle 10 and an area rearward of the vehicle 10, including the trailer 16. Each sideview mirror assembly 18 can be mounted to the exterior 12 of the vehicle 10 on either side of the vehicle 10. For brevity, this description follows with reference to the sideview mirror assembly 18 mounted on the driver's side of the vehicle 10. By extension, this description follows with reference to the other sideview mirror assembly 18 mounted on the passenger's side of the vehicle 10, which is configured as a mirror image of the sideview mirror assembly 18 mounted to on the driver's side of the vehicle 10.

The sideview mirror assembly 18 includes a body 20. The body 20 includes a sideview mirror housing 22, which defines an opening for a sideview mirror 24. The body 20 also includes a mounting arm 26 configured to mount the sideview mirror housing 22 to the exterior 12 of the vehicle 10. The sideview mirror assembly 18 also includes a camera 28 located in the body 20. As shown, the camera 28 is located in the mounting arm 26, however, in other arrangements, the camera 28 can be located in the sideview mirror housing 22.

As shown, the camera 28 is positioned and oriented in the body 20 such that it is pointing substantially downward toward the ground. The camera 28 can be a fish-eye camera, which has a field-of-view 30 including the ground, the area to the side of the vehicle 10, and the area rearward of the vehicle 10, including the sides and top of the trailer 16. The camera 28 can define a horizontal axis 32 substantially parallel to the ground, by which the field-of-view 30 can be bisected into two regions: a below-horizontal region 34 and an above-horizontal region 36. The below-horizontal region 34 is the region below the horizontal axis 32. The field-of-view 30 in the below-horizontal region 34 includes the lower sides of the vehicle 10 and the trailer 16, one or more of the wheels of the vehicle 10 and the trailer 16, and a portion of the ground to the side of the vehicle 10 and the trailer 16. The above-horizontal region 36 is the region above the horizontal axis 32, including, with the camera 28, as shown, being a fish-eye camera pointing substantially downward, the upper periphery of the field-of-view 30. The field-of-view 30 in the above-horizontal region 36 includes the upper sides of the vehicle 10 and the trailer 16, and is directed rearward toward an overhead target position 38 past the sideview mirror housing 22 and otherwise past the body 20. The location of the overhead target position 38 may vary based on the portion of the vehicle 10, the trailer 16, or the adjacent surroundings of the vehicle 10 and/or the trailer 16 that a driver of the vehicle 10 wants to see. For example, the overhead target position 38 can be an upper, front corner of the trailer 16. The driver may want to see this area and associated areas behind it, e.g., an upper, rear corner of the trailer 16 and/or the adjacent surroundings, when reversing the vehicle 10 and the trailer 16, for example, when parking. In particular, the driver may want to see this area and associated areas behind it when navigating the vehicle 10 and the trailer 16 under an obstacle, for example, when driving into a garage or under overhead tree branches.

Figure 2:
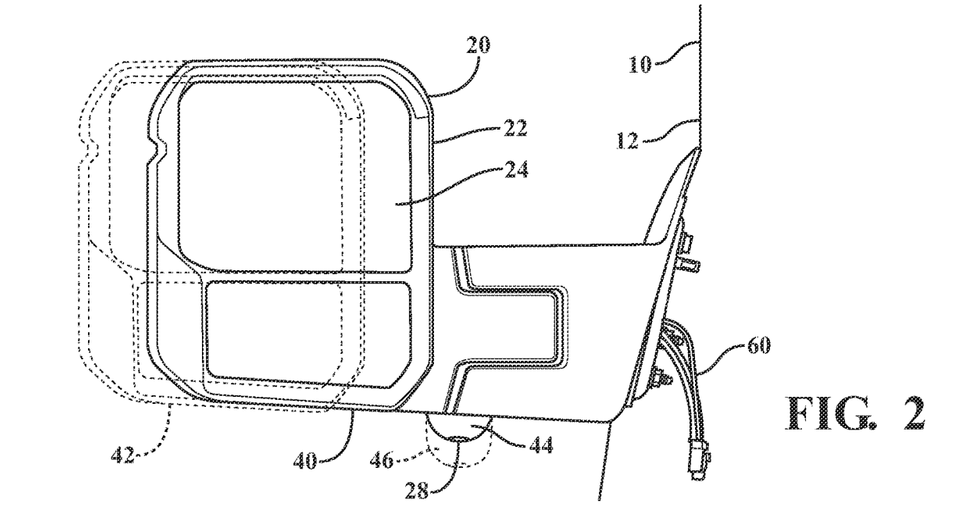
FIG. 2 is a front view of the sideview mirror assembly showing the camera in a normal position and an extended position and the sideview mirror housing in a normal position and an extended position.

Driver visibility of the vehicle 10 and the surroundings of the vehicle 10, including the overhead target position 38, through camera visibility in relation to the field-of-view 30 of the camera 28 as well as mirror visibility through the sideview mirror 24, may be improved or increased through movement of the camera 28 and/or the sideview mirror housing 22. As shown in FIG. 2, the sideview mirror housing 22 may be extendable and retractable relative to the exterior 12 of the vehicle 10 between a normal position 40 and an extended position 42. In the normal position 40, the sideview mirror housing 22 can be a predetermined distance from the exterior 12 of the vehicle 10. For example, the sideview mirror housing 22 can be at a standard distance from the exterior 12 of the vehicle 10. In the extended position 42, the sideview mirror housing 22 is extended laterally from the exterior 12 of the vehicle 10. Extension of the sideview mirror housing 22 may improve mirror visibility of the side of the vehicle 10 and/or the trailer 16, while retraction of the sideview mirror housing 22 may improve the aerodynamics of the sideview mirror assembly 18, thus increasing gas mileage of the vehicle 10 and reducing wind noise. The sideview mirror housing 22 may be extendable and retractable by any suitable actuator or mechanism. For example, the mounting arm 26 may telescope such that the sideview mirror housing 22 may telescope from the mounting arm 26.

While the lateral position of the sideview mirror housing 22 relative to the exterior 12 of the vehicle 10 may be variable, the lateral position of the camera 28 relative to the exterior 12 of the vehicle 10 may remain fixed. However, the camera 28 may be extendable and retractable relative to the body 20 to improve camera visibility of the overhead target position 38 in relation to the field-of-view 30. Accordingly, the camera 28 may be extendable and retractable relative to the body between a normal position 44 and an extended position 46. In the normal position 44, the lens of the camera 28 is below the body 20, specifically, below a bottom surface of the mounting arm 26. In the extended position 46, the lens of the camera 28 is further below the body 20 than in the normal position 44, specifically, further below a bottom surface of the mounting arm 26. Retracting the camera 28 to the normal position 44 improves the aerodynamics of the sideview mirror assembly 18, thus increasing gas mileage of the vehicle 10 and reducing wind noise, and also improves the styling and visual appearance of the sideview mirror assembly 18. On the other hand, extension of the camera 28 to the extended position 46 improves camera visibility of the overhead target position 38 in relation to the field-of-view 30. The camera 28 can be extendable and retractable by any suitable actuator or mechanism, as will be described further below with respect to FIG. 4.

Figure 3A:
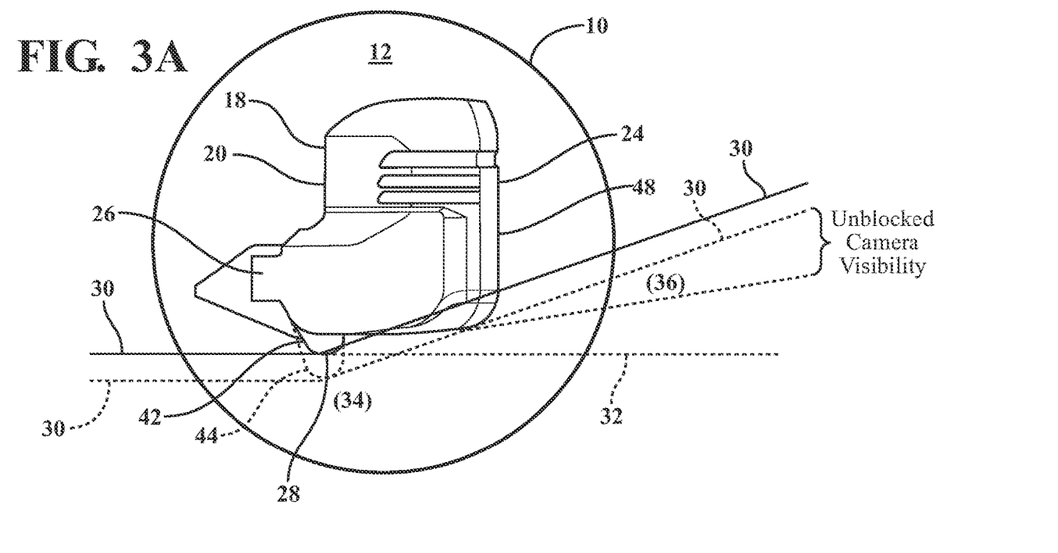
FIG. 3A is a side view of the sideview mirror assembly showing aspects of the field-of-view of the camera with the camera in the normal position and the extended position.
Figure 3B:
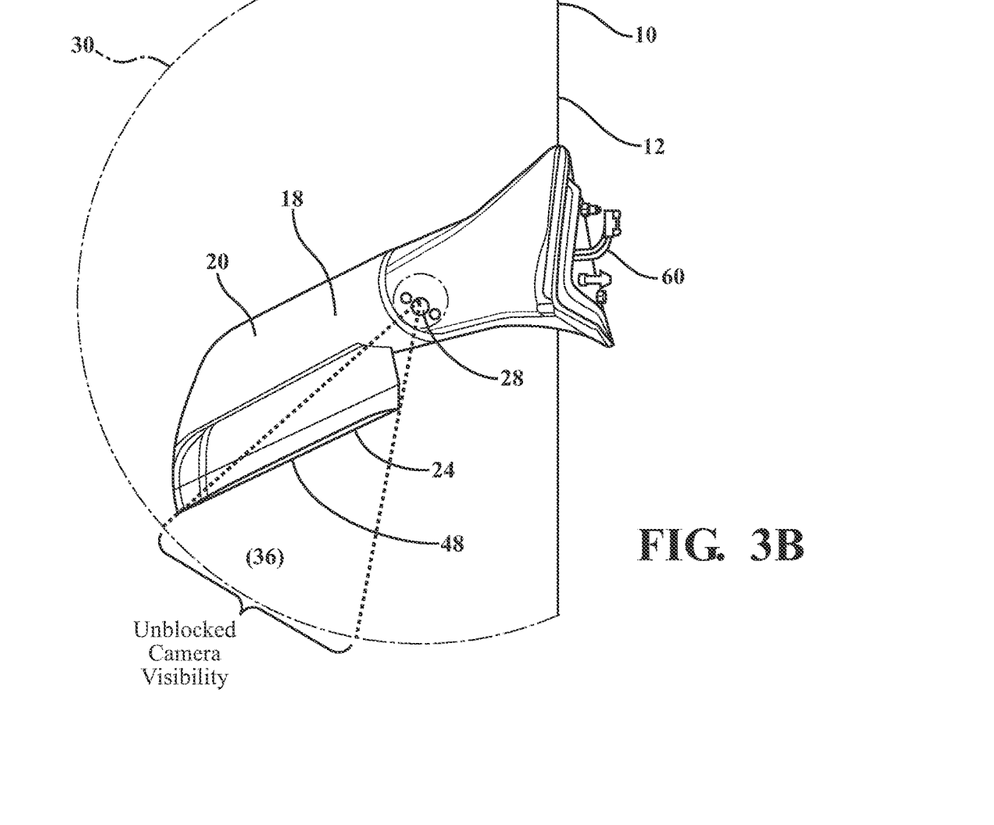
FIG. 3B is a top view of the sideview mirror assembly showing aspects of the field-of-view of the camera with the camera in the normal position and the extended position.

In some arrangements, when the camera 28 is in the normal position 44, a portion of the body 20 may block (i.e., obstruct or occlude) a portion of the field-of-view 30. When a portion of the field-of-view 30 is blocked by the body 20, the driver may not be able to see the overhead target position 38 through camera visibility. As shown in FIGS. 3A and 3B, a portion of the field-of-view 30 may be blocked by the sideview mirror housing 22 in the normal position 44 and may be unblocked by the sideview mirror housing 22 in the extended position 46. In the normal position 44, a bottom surface of the sideview mirror housing 22 may intersect the camera 28 and the overhead target position 38 in the above-horizontal region 36. In other words, in the normal position 44, camera visibility of the overhead target position 38 may be blocked by the bottom surface of the sideview mirror housing 22. Moreover, the sideview mirror 24 may define a plane 48, and the plane 48 may intersect the camera 28 and the overhead target position 38 in the normal position 44. In other words, in the normal position 44, camera visibility of the overhead target position 38 may be blocked by the plane 48. On the other hand, in the extended position 46, the bottom surface of the sideview mirror housing 22 does not intersect the camera 28 and the overhead target position 38 in the above-horizontal region 36. In other words, in the extended position 46, camera visibility of the overhead target position 38 may be unblocked by the bottom surface of the sideview mirror housing 22. Similarly, the plane 48 does not intersect the camera 28 and the overhead target position 38 in the extended position 46. In other words, in the extended position 46, camera visibility of the overhead target position 38 may be unblocked by the plane 48. In both the normal position 44 and the extended position 46, the visibility of the camera 28 of the below-horizontal region 34 remains unblocked. As such, no portion of the body 20 blocks the below-horizontal region 34 of the field-of-view 30.

In other arrangements, when the camera 28 is in the normal position 44, a portion of the mounting arm 26 may block a portion of the field-of-view 30. In the normal position 44, a bottom surface of the mounting arm 26 may intersect the camera 28 and the overhead target position 38 in the above-horizontal region 36. In other words, in the normal position 44, camera visibility of the overhead target position 38 may be blocked by the mounting arm 26. In the extended position 46, the bottom surface of the mounting arm 26 does not intersect the camera 28 and the overhead target position 38 in the above-horizontal region 36. In other words, in the extended position 46, camera visibility of the overhead target position 38 may be unblocked by the mounting arm 26.

Figure 4:
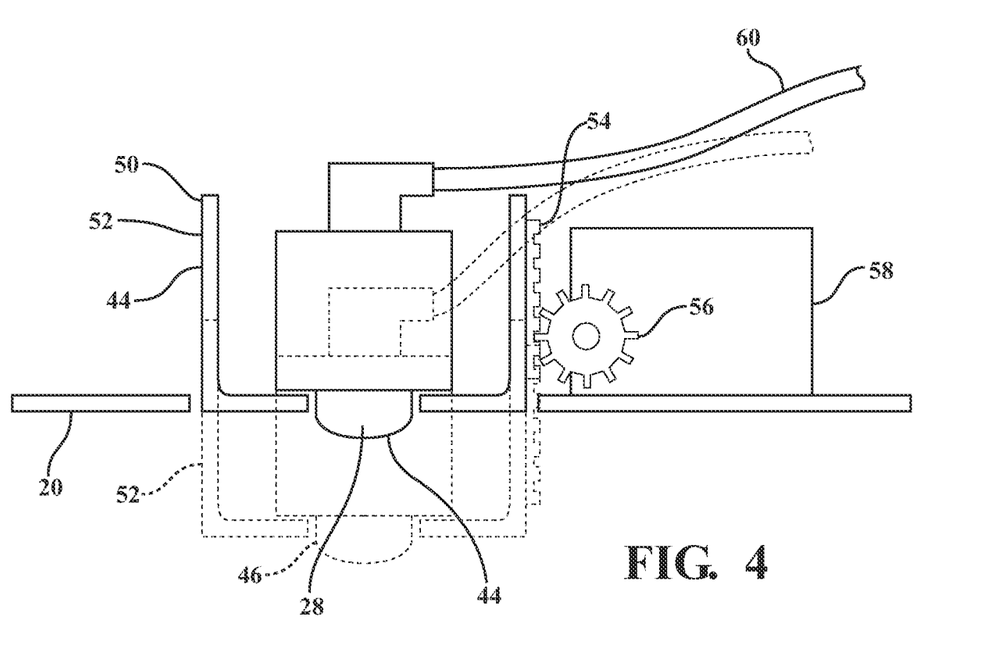
FIG. 4 is an example of the camera assembly showing aspects of the camera moving between the normal position and the extended position.

As mentioned above, the camera 28 can be mounted for movement between the normal position 44 and the extended position 46 in any suitable manner. For example, as shown in FIG. 4, the camera 28 can be a part of a camera assembly 50 configured to move the camera 28 between the normal position 44 and the extended position 46. The camera assembly 50 is located in the body 20 and includes a camera housing 52 including a toothed strip 54, a gear 56, a motor 58, and a camera wiring harness 60. The camera 28 is located in the camera housing 52 such that the lens of the camera 28 is not covered by the camera housing 52. The toothed strip 54 can form a portion of the exterior of the camera housing 52. The toothed strip 54 can interact with the gear 56 such that when the gear 56 is driven by the motor 58, the gear 56 rotates along the toothed strip 54, causing the camera housing 52, and thus the camera 28, to extend and retract within the body 20. The camera wiring harness 60 can transmit video data from the camera 28 to any suitable part or system of the vehicle 10, as described in further detail with respect to FIG. 5.

Figure 5:
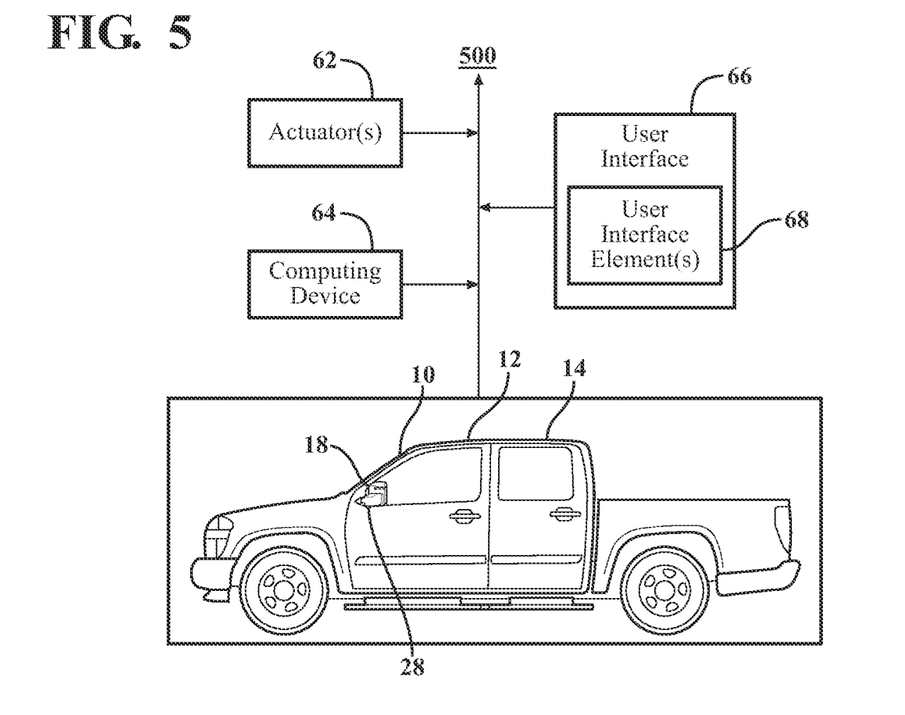
FIG. 5 is an example of a vision system of the vehicle.

As shown in FIG. 5, the sideview mirror assembly 18, including the camera assembly 50, are part of a vision system 500 of the vehicle 10. The vision system 500 can include one or more actuators 62, a computing device 64, and a user interface 66 having one or more user interface element(s) 68, among other elements of the vision system 500. The actuator(s) 62 are located in the body 20 of the sideview mirror assembly 18 and are connected between the body 20 and the camera 28. The actuator(s) 62 are operable to move the camera 28 between the normal position 44 and the extended position 46. In one example, the actuator(s) 62 for moving the camera 28 between the normal position 44 and the extended position 46 can be the gear 56 and/or the motor 58 of the camera assembly 50. In other examples, the actuator(s) 62 can be any suitable actuator(s). The actuator(s) 62 can also be operable to move the side view mirror housing 22 between the normal position 40 and the extended position 42.

The computing device 64 is in operative communication with the actuator(s) 62 and the user interface 66. The vision system 500 can operate the computing device 64 to operate the actuator(s) 62 in order to move the camera 28 between the normal position 44 and the extended position 46. The computing device 64 can be dedicated to operating the actuator(s) 62 or could additionally support the operation of other systems of the vehicle 10. The computing device 64 can include a processor communicatively coupled with a memory. The processor may include any device capable of executing machine-readable instructions, which may be stored on a non-transitory computer-readable medium, for example, the memory. The processor may include a controller, an integrated circuit, a microchip, a computer, and/or any other computing device.

The memory may include any type of computer readable medium suitable for storing data and algorithms. For example, the memory may include RAM, ROM, a flash memory, a hard drive, and/or any device capable of storing machine readable instructions. Various algorithms and data for operating the actuator(s) 62 may reside in whole or in part in the memory. The computing device 64 may, for instance, have a module residing in memory for operating the actuator(s) 62 to move the camera 28 between the normal position 44 and the extended position 46. The module may be configured to receive and analyze data, signals, and/or other information from the user interface 66 and/or the computing device 64, and identify a signal based on this information. The signal can be a retraction signal or an extension signal. The retraction signal can be an instruction that the camera 28 should be retracted from the extended position 46 to the normal position 44 and/or that the sideview mirror housing 22 should be retracted from the extended position 42 to the normal position 40. The extension signal is an instruction that the camera 28 should be extended from the normal position 44 to the extended position 46 and/or that the sideview mirror housing 22 should be extended from the normal position 40 to the extended position 42.

The module may include instructions for operating the actuator(s) 62 to move the camera 28 between the normal position 44 and the extended position 46. For example, when the camera 28 is in the normal position 44, and the module identifies an extension signal, the module can cause the actuator(s) 62 to be operated to move the camera 28 from the normal position 44 to the extended position 46. Similarly, when the camera 28 is in the extended position 46, and the module identifies a retraction signal, the module can cause the actuator(s) 62 to be operated to move the camera 28 from the extended position 46 to the normal position 44.

The module may also include instructions for operating the actuator(s) 62 to move the sideview mirror housing 22 between the normal position 40 and the extended position 42. For example, when the sideview mirror housing 22 is in the normal position 40, and the module identifies an extension signal, the module can cause the actuator(s) 62 to be operated to move the sideview mirror housing 22 from the normal position 40 to the extended position 42. Similarly, when the sideview mirror housing 22 is in the extended position 42, and the module identifies a retraction signal, the module can cause the actuator(s) 62 to be operated to move the sideview mirror housing 22 from the extended position 42 to the normal position 40.

The user interface 66 can be in operative communication with the actuator(s) 62 and the computing device 64. The user interface 66 can be located in the passenger compartment 14 of the vehicle 10. For example, the user interface 66 can be provided on a dashboard and/or an instrument panel of the passenger compartment 14. The user interface 66 can include a display for displaying the video data received from the camera 28 through the camera wiring harness 60. The display can be positioned in the passenger compartment 14 such that it is visible to the driver and/or another occupant of the vehicle 10. In one implementation, the camera 28 and the display are part of a perception system typical of vehicles. Specifically, the camera 28 and the display are included in the vehicle 10 as part of a panoramic view monitor (PVM) for adding driver visibility of the vehicle 10 and the surroundings of the vehicle 10. In this implementation, the vehicle 10 may include one or more additional cameras, and the display may display the vehicle 10 and the surroundings of the vehicle 10 using video data from any combination of the camera 28 and the additional camera(s).

As mentioned above, the user interface 66 can include the user interface element(s) 68 for controlling actuation of the camera 28 and/or the sideview mirror housing 22. The user interface element(s) 68 can be any suitable user interface element(s), for example, one or more buttons, dials, levers, knobs, keys, selectors, screens, and/or touch screens, and/or any combination of the foregoing. When used by a driver or other occupant of the vehicle 10, user interface element(s) 68 can be configured to send the retraction signal and/or the extension signal to the computing device 64 and/or module in order to actuate the camera 28 between the normal position 44 and the extended position 46, and/or to actuate the sideview mirror housing 22 between the normal position 40 and the extended position 42.

Now that the various potential systems, devices, elements, and/or components have been described, a method, including various possible steps of such method, will now be described. The method described may be applicable to the arrangements described above, but it is to be understood that the method can be carried out with other suitable systems and arrangements. Moreover, the method may include other steps that are not shown here, and in fact, the method is not limited to including every step shown. The blocks that are illustrated here as part of the method are not limited to the particular chronological order. Indeed, some of the blocks may be performed in a different order than what is shown and/or at least some of the blocks shown can occur simultaneously.

Figure 6:
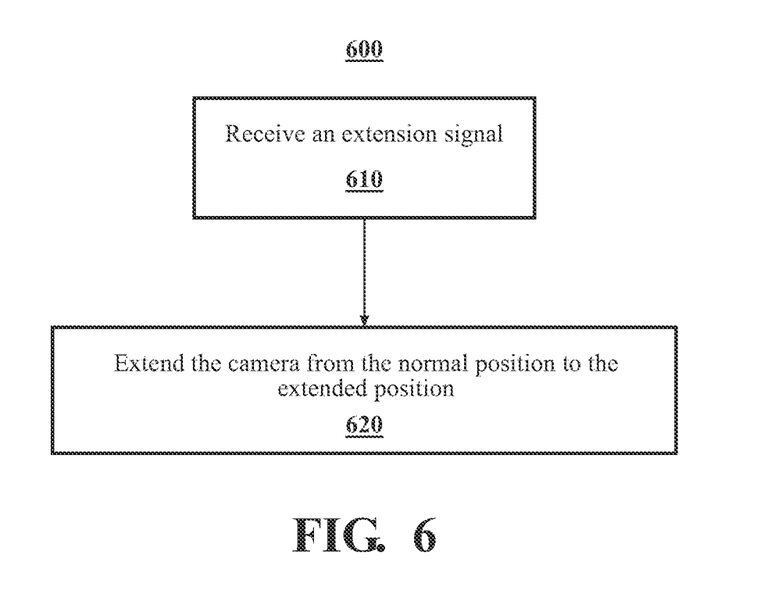
FIG. 6 is an example of a method of extending the camera from the normal position to the extended position.

Referring to FIG. 6, an example of a method 600 is shown. At block 610, a signal can be received. The signal can be received by the computing device 64 and/or the module from the user interface 66. As described herein, the signal can be a retraction signal or an extension signal. The method 600 can continue to block 620. At block 620, the camera can be extended from the normal position 44 to the extended position 46. For example, responsive to the received signal, the computing device 64 and/or the module can cause the actuator(s) 62 to be operated based on the signal. For example, if the computing device 64 and/or the module receives the retraction signal, the computing device 64 and/or the module can cause the actuator(s) 62 to retract the camera 28 from the extended position 46 to the normal position 44. If the computing device 64 and/or the module receives the extension signal, the computing device 64 and/or the module can cause the actuator(s) 62 to extend the camera 28 from the normal position 44 to the extended position 46. In conjunction with block 620, the sideview mirror housing 22 can be extended from the normal position 40 to the extended position 42. The method 600 can then return to block 610 or proceed to some other block.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the function(s) noted in the block diagrams may occur out of the order noted in the figures. For example, two blocks shown in succession may, in fact, be executed substantially concurrently, or the blocks may sometimes be executed in the reverse order, depending on the functionality involved.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A sideview mirror assembly for a vehicle, comprising:
   a body including a sideview mirror housing having a bottom surface; and
   a camera located in the body about the sideview mirror housing, having a field-of-view including an above-horizontal region directed rearward toward an overhead target position past the sideview mirror housing, and mounted for movement relative to the body between a normal position, in which the camera is below the bottom surface and in which the sideview mirror housing at least partially blocks the field-of-view in the above-horizontal region, and an extended position, in which the camera is further below the bottom surface relative to the normal position and in which the sideview mirror housing does not block the field-of-view in the above-horizontal region, whereby movement of the camera from the normal position to the extended position unblocks camera visibility of the overhead target position by the sideview mirror housing.

2. The sideview mirror assembly of claim 1, wherein, in the normal position, the bottom surface at least partially blocks the field-of-view in the above-horizontal region, and wherein, in the extended position, the bottom surface does not block the field-of-view in the above-horizontal region, whereby movement of the camera from the normal position to the extended position unblocks camera visibility of the overhead target position by the bottom surface.

3. The sideview mirror assembly of claim 1, wherein the sideview mirror housing includes a sideview mirror, the sideview mirror defining a plane, wherein, in the normal position, the plane intersects the camera and the overhead target position in the above-horizontal region, and wherein, in the extended position, the plane does not intersect the camera and the overhead target position in the above-horizontal region, whereby movement of the camera from the normal position to the extended position unblocks camera visibility of the overhead target position by the plane.

4. The sideview mirror assembly of claim 1, wherein the field-of-view includes a below-horizontal region directed downward toward the ground, and wherein the sideview mirror housing does not intersect the camera and a ground in both the normal position and the extended position, whereby camera visibility of the ground is unblocked by the sideview mirror housing.

5. The sideview mirror assembly of claim 1, wherein the camera is a fish-eye camera, the camera points substantially downward, and the above-horizontal region includes an upper periphery of the field-of-view.

6. The sideview mirror assembly of claim 1, further comprising:
a camera housing located in the body about the sideview mirror housing, the camera located in the camera housing, and the camera housing mounted for movement relative to the body, and including a toothed strip; and
a gear located in the body, the gear rotatable along the toothed strip to move the camera housing, whereby the camera is moved between the normal position and the extended position.

7. The sideview mirror assembly of claim 1, further comprising:
an actuator connected between the body and the camera, the actuator operable to move the camera between the normal position and the extended position.

8. The sideview mirror assembly of claim 7, further comprising:
a computing device in operative communication with the actuator, the computing device configured to receive at least one of a retraction signal and an extension signal, and operate the actuator to move the camera from the extended position to the normal position responsive to receiving the retraction signal, and operate the actuator to move the camera from the normal position to the extended position responsive to receiving the extension signal.

9. The sideview mirror assembly of claim 8, further comprising:
a user interface in operative communication with the computing device, the user interface configured to receive a user input, the user input being at least one of a retraction input and an extension input, the user interface configured to send the retraction signal to the computing device responsive to the retraction input, and send the extension signal to the computing device responsive to the extension input.

10. The sideview mirror assembly of claim 1, wherein the body includes a mounting arm for mounting the sideview mirror housing, and wherein the camera is located in the mounting arm.

11. A sideview mirror assembly for a vehicle, comprising:
a body including a sideview mirror housing including a bottom surface; and
a fish-eye camera located in the body about the sideview mirror housing, pointed substantially downward, and having a field-of-view including an above-horizontal region, the above-horizontal region including an upper periphery of the field-of-view, and directed rearward toward an overhead target position past the sideview mirror housing, and mounted for movement relative to the body between a normal position, in which the camera is below the bottom surface, and the bottom surface at least partially blocks the field-of-view in the above-horizontal region, and an extended position, in which the camera is further below the bottom surface relative to the normal position, and the bottom surface does not block the field-of-view in the above-horizontal region, whereby movement of the camera from the normal position to the extended position unblocks camera visibility of the overhead target position by the bottom surface.

12. The sideview mirror assembly of claim 11, wherein the sideview mirror housing includes a sideview mirror, the sideview mirror defining a plane, wherein, in the normal position, the plane intersects the camera and the overhead target position in the above-horizontal region, and wherein, in the extended position, the plane does not intersect the camera and the overhead target position in the above-horizontal region, whereby movement of the camera from the normal position to the extended position unblocks camera visibility of the overhead target position by the plane.

13. The sideview mirror assembly of claim 11, wherein the field-of-view includes a below-horizontal region directed downward toward the ground, and wherein the sideview mirror housing does not intersect the camera and a ground in both the normal position and the extended position, whereby camera visibility of the ground is unblocked by the sideview mirror housing.

14. The sideview mirror assembly of claim 11, further comprising:
a camera housing located in the body about the sideview mirror housing, the camera located in the camera housing, and the camera housing mounted for movement relative to the body, and including a toothed strip; and
a gear located in the body, the gear rotatable along the toothed strip to move the camera housing, whereby the camera is moved between the normal position and the extended position.

15. The sideview mirror assembly of claim 11, further comprising:
an actuator connected between the body and the camera, the actuator operable to move the camera between the normal position and the extended position.

16. The sideview mirror assembly of claim 15, further comprising:
a computing device in operative communication with the actuator, the computing device configured to receive at least one of a retraction signal and an extension signal, and operate the actuator to move the camera from the extended position to the normal position responsive to receiving the retraction signal, and operate the actuator to move the camera from the normal position to the extended position responsive to receiving the extension signal.

17. The sideview mirror assembly of claim 16, further comprising:
a user interface in operative communication with the computing device, the user interface configured to receive a user input, the user input being at least one of a retraction input and an extension input, the user interface configured to send the retraction signal to the computing device responsive to the retraction input, and send the extension signal to the computing device responsive to the extension input.

18. A method of unblocking camera visibility of a camera located in a sideview mirror assembly of a vehicle, the method comprising the steps of:

with a camera located in a body of the sideview mirror assembly about a sideview mirror housing of the body, the sideview mirror housing including a bottom surface, having a field-of-view including an above-horizontal region directed rearward toward an overhead target position past the sideview mirror housing, and mounted for movement relative to the body between a normal position and an extended position, in the normal position, in which the camera is below the bottom surface relative to the normal position and in which the sideview mirror housing at least partially blocks the field-of-view in the above-horizontal region, receiving an extension signal; and responsive to receiving the extension signal, extending the camera from the normal position to the extended position, in which the camera is further below the bottom surface and in which the sideview mirror housing does not block the field-of-view in the above-horizontal region, whereby movement of the camera from the normal position to the extended position unblocks camera visibility of the overhead target position by the sideview mirror housing.

19. The method of claim 18, wherein, in the normal position, the bottom surface at least partially blocks the field-of-view in the above-horizontal region, and wherein, in the extended position, the bottom surface does not block the field-of-view in the above-horizontal region, whereby movement of the camera from the normal position to the extended position unblocks camera visibility of the overhead target position by the bottom surface.

20. The method of claim 18, wherein the camera is a fish-eye camera, the camera points substantially downward, and the above-horizontal region includes an upper periphery of the field-of-view.

\* \* \* \* \*